Re. 24625
June 5, 1956      H. L. PENBERTHY      2,749,378
METHOD AND APPARATUS FOR GLASS PRODUCTION Filed Jan. 8, 1954      3 Sheets—Sheet 1

INVENTOR
Harvey L. Penberthy

Strauch, Nolan & Diggins
ATTORNEYS

INVENTOR
HARVEY L. PENBERTHY

June 5, 1956     H. L. PENBERTHY     2,749,378
METHOD AND APPARATUS FOR GLASS PRODUCTION Filed Jan. 8, 1954     3 Sheets-Sheet 3

INVENTOR
HARVEY L. PENBERTHY

BY *Strauch, Nolan & Riggins*

ATTORNEYS

United States Patent Office 2,749,378
Patented June 5, 1956

2,749,378
METHOD AND APPARATUS FOR GLASS PRODUCTION

Harvey L. Penberthy, Seattle, Wash.

Application January 8, 1954, Serial No. 402,873

27 Claims. (Cl. 13—6)

This invention relates to a method and means for producing glass in a continuous or batch process wherein melting and refining of the glass are accomplished partially by means of the heat developed by the passage of an electric current through the glass.

When glass is melted from batch in a conventional tank furnace by applying heat from a burning fuel over the top of the batch and by supplying additional heat from below the batch by passing electric current through the molten glass, theory teaches that the production of an extra ton of glass should require 515 kilowatt hours of electric heat as an absolute minimum for melting and refining. In previous practice a common figure achieved was 700 to 2100 kilowatt hours per ton. According to the method of this invention it has been possible to achieve the melting and refining of such an extra ton of glass while utilizing only approximately 400 kilowatt hours per ton.

This extremely low figure is somewhat difficult to explain on the basis of prior theory, but it is believed that it is due to the novel electrode placement and circuits which are utilized according to the invention. It has been known for some time that the melting of glass, either with or without electrical energy, results in the creation and sustaining of convection currents in the glass. Heretofore these convection currents have been considered beneficial and have frequently been promoted.

It is my belief that this marked decrease in the amount of power necessary is due to the reduction or substantial elimination of these convection currents.

It is accordingly an object of this invention to provide a novel placement of electrodes and a novel circuit for such electrodes which will reduce, substantially eliminate, or partially reverse the convection currents which normally obtain in a glass furnace heated by combustion in the conventional manner.

It is another object of this invention to provide a method of producing glass through the use of a tank having a novel placement of electrodes and connections for such electrodes, wherein a substantial saving in electric power is achieved.

It is a still further object of this invention to produce glass through the use of a tank having electrodes placed therein and connected in such a manner as to result in a more uniform, homogeneous glass.

Further objects and advantages of the invention will become apparent through reference to the following description and drawings, wherein Figure 1 represents a cross section of a conventional gas and electrically heated glass furnace showing the convection currents which obtain therein;

Figure 1:
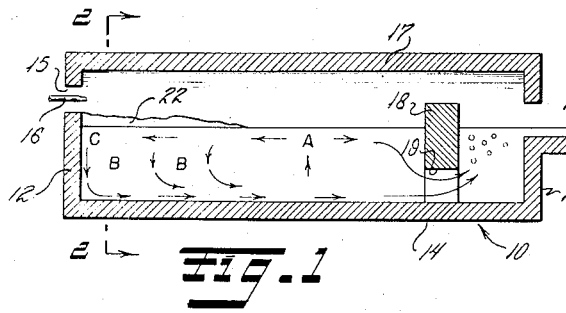
Figure 2:
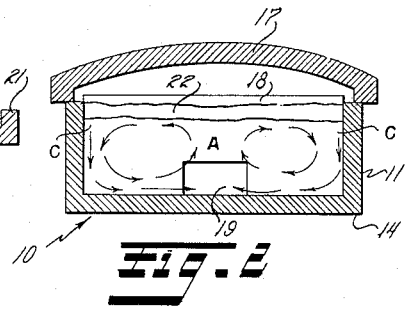
Figure 2 is a cross-sectional view of the furnace shown in Figure 1, taken on the line 2—2 of Figure 1.

Referring more particularly to the furnace of Figures 1 and 2, Figure 1 shows a longitudinal section of a typical continuous glass tank 10 wherein the normal convection currents are shown by the arrows. The tank 10 comprises a pair of side walls 11, end walls 12 and 13 and a bottom wall 14. The end wall 12, which is at the input end of the tank, contains a conventional aperture 15 through which gas jets 16 may be introduced. The gas jets 16 are provided with the usual fuel supplies, not shown, for introducing a burning jet of gas into the interior of the furnace 10. Conventional means, not shown, for introducing glass into the furnace is also provided. The furnace 10 is further provided with a domed top 17 and a bridge wall 18 having a conventional throat 19 therein. At the output end of the tank 10 there is provided a draw off 20 in a tank extension 21.

The direction of flow of normal convection currents is shown by the arrows. Flames from the gas jets heat the glass at A in the center of the tank by radiation and conduction, thereby making this glass less dense. The shadowing effect of the batch blanket 22 and heat losses through the walls of the tank make the glass at B and C under the batch blanket cooler and hence more dense, whereby a counterclockwise longitudinal convection current is started and maintained.

Viewing the tank in a transverse direction, as in Figure 2, it will be seen that this creation of less dense glass at A and the creation of more dense glass at the cool sidewalls results in the production of counterclockwise and clockwise convection currents to the left and to the right of the center of the tank respectively.

Prior to this invention, these convection currents had been considered beneficial since they carried heat under the batch blanket and permitted melting from below. Indeed there have been numerous schemes for strengthening these convection currents, as through the use of centrally located vertical electrodes which are remote from the side walls of the tank. It was the purpose of such arrangements to cause convection currents to rise vertically along the electrodes to contact the underside of the batch blanket and to exert a stirring motion. It was a further purpose of emphasizing these convection currents, to cause the rising stream of hot glass to spread out over the top of the glass from the central portion of the tank in the direction of the side walls of the tank.

While there is undoubtedly an advantage in securing the introduction of heat under the batch blanket, it has now been found that this benefit is largely outweighed by the disadvantages entailed. Thus, when such convection currents are present, a small portion of the glass which is melted from the batch blanket at C all across the back wall 12 of the tank and adjacent portions of the side walls 11, is never heated sufficiently to free itself of seed and dissolved gases and never becomes homogeneous. This glass follows the arrows emanating from C and ultimately passes through the throat of the tank. There it is mixed with hot glass from A, is heated, and forms additional seed. In time, the gases in the seed would redissolve, but in current practice much of the gas goes directly to the feed end and into the ware, so that a very small quantity of this low temperature glass exerts an important detrimental effect on the glass quality, both from the standpoint of seed and cords.

It is an important feature of this invention that the electrodes are so placed and connected as to liberate most of the electric energy in a generally U or V-shaped band near the walls of the tank under the batch blanket. When this is done, the cooling effect of the side and end walls is modified, and the downward convection current originating at C is diminished or eliminated. According to the invention this heating of the glass near the side and back walls may be accomplished through the use of three or more electrodes using single or polyphase currents. When the electrodes are connected according to the invention, the current paths are partially repellent to each other, which causes sufficient current to spread to the corners of the tank to accomplish the desired purpose.

The invention may be practiced with either horizontal or vertical electrodes although the unique characteristics of the desired current flow make it necessary to locate such electrodes in a particular manner. In prior practice, where current flow was predominantly across the glass tank and where accentuation of convection currents was thought advantageous, it has been found desirable to utilize vertical electrodes generally centrally located, and at any event remote from the side walls, in order to provide easy current control and the desired stirring action. According to this invention current flow is predominantly longitudinal and hence adjustable horizontal electrodes are quite effective for current control. Since normal convection currents are to be retarded rather than accelerated the side and end wall positioning of horizontal electrodes is not only possible but necessary. Deterioration of tank walls may be ameliorated in a manner presently described in connection with Figure 8. Where vertical electrodes are used, it is necessary that they be located near the side and end walls to bring about the desired retardation of normal convection currents.

According to this invention more than half of the heat liberated due to electricity by the Joule effect should be in a zone near the side walls and back wall of the furnace under the area generally covered with the floating batch blanket. Preferably this zone should be no wider than approximately one-fourth the tank width and should be confined to the area beneath the batch blanket.

While the predominant heating effect should take place in a U or V shape under the batch blanket, currents across the tank are not harmful and promote melting by adding additional heat. The heat that such currents liberate, however, should not predominate over the heat liberated in the U and V-shaped current paths since this would tend to accelerate the normal convection currents.

Figure 3:
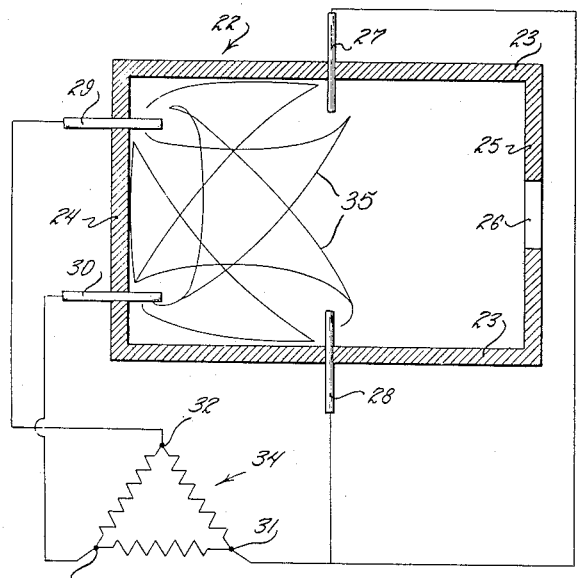
Figure 3 is a horizontal section of a glass furnace having electrodes mounted therein and connected according to the invention.

In Figure 3 there is shown an embodiment of the invention wherein a tank 22 having side walls 23 and end walls 24 and 25 and a throat 26 is provided with four electrodes 27, 28, 29 and 30. The electrodes 27 and 28 enter the side walls of the tank while the electrodes 29 and 30 enter the end wall 24. The electrodes may be either horizontal or inclined, as in Figure 8, and should be placed in the lower two thirds of the glass depth.

The electrodes 27, 28, 29 and 30 are connected respectively to the terminals 31, 32 and 33 of a three phase current supply shown as a polyphase transformer 34. While a three phase transformer is illustrated it will be understood that any suitable current supply might be used such as three single phase transformers or mere line supply. The electrodes 27 and 28 are connected together to terminal 31 while electrodes 29 and 30 are connected to the other two terminals of the transformer. The currents produced are indicated by the envelopes 35 and form a substantially U-shaped pattern under the batch blanket. While there are diagonal currents between electrodes 27 and 30, and 29 and 28 respectively, the predominant heating effect is along the side walls and not crosswise of the tank.

Figure 8:
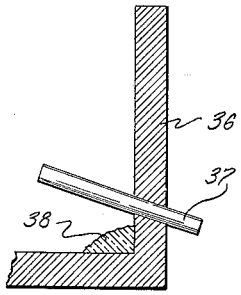
Figure 8 is a partial cross section of the side wall of a glass furnace showing the placement of an electrode therein.

The electrodes are preferably of molybdenum, although any suitable electrodes might be used, and may be either horizontal, vertical or inclined as is shown in Figure 8. The inclined electrode of Figure 8 is preferred for reasons which will appear presently.

In melting tanks of conventional types, either continuous or intermittent, a layer of defective glass often accumulates on the tank bottom, below the level of the good glass. This defective glass is made up of the base composition of the batch that is charged into the tank, plus contaminants. These contaminants are generally iron oxide from tramp iron inadvertently included in the batch, alumina and zirconia from solution of the tank refractories. Frequently, refractory stones are also present in this layer of defective glass and occasionally the layer is augmented by lumps of a denser glass introduced as cullet.

This layer gradually builds up during the operation of the tank until it feeds into the glass stream going through the throat to the working end of the tank, and this streak of bad glass tends to produce cords in the ware which reduce its strength. At times this problem may become serious enough to cause rejection of the ware.

It has been a discovery of this invention, that if this defective glass is thoroughly blended with the regular glass at a rate approximately equal to the rate of its formation, its harmful effects may be eliminated. It has further been discovered that this blending may be very effectively accomplished by placing electrodes in such a position in the tank so as to enable the electrodes to act as thermal pumps when electric current is passed between them through the glass. There is a tendency for this defective layer of glass to accumulate near the back and side walls under the batch blanket and accordingly the electrodes should also be placed in this area.

Figure 11:
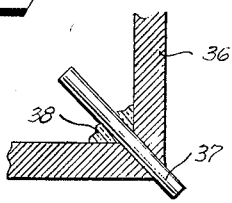
Figure 11 is a cross-section of a glass furnace showing the placement of an electrode therein.

While properly placed horizontal electrodes are effective to cause mixing of this bad glass, it has been found that inclined electrodes, such as shown in Figure 8, are somewhat more effective in mixing the bad glass and diminish the corrosion of the walls of the tank. Thus, referring to Figure 8, there is seen a tank wall 36 in which is mounted an inclined electrode 37. The electrode 37 may be mounted in any conventional manner, and is preferably adjustably mounted through a cooled fixture of the type disclosed in my application No. 371,858, filed August 3, 1953, now Patent No. 2,693,498. The electrode 37 may be placed near the floor of the tank in or just above the collection of bad glass 38 which accumulates in the lower corner of the tank. While the electrode of Figure 8 enters the tank wall above the tank floor it has also been found advantageous to mount the electrode in the bottom corner of the tank as shown in Fig. 11. In this position the electrode will exert a maximum mixing effect on the bad glass 38. The angle of inclination is not critical and may be varied from anything above the horizontal to about 45 degrees. The most advantageous angle varies from tank to tank, although it has been found preferable to use such an angle of inclination as would cause the intersection of the axes of oppositely placed electrodes to occur outside the tank.

When current is passed from an inclined electrode, such as electrode 37, the heated glass becomes more fluid around the electrode and is conducted through the cooler and more dense glass farther removed from the electrode as through a pipe of viscous glass. The hot glass thus flows along the length of the electrode and does not rise until it reaches the tip of the electrode thereby diminishing the flow of glass up the side wall of the tank. The glass currents produced in this manner counteract and may substantially stop the conventional convection currents found in normal glass tanks and, in so doing, homogeneously mix the bad glass 38 with the rest of the glass in the batch.

Figure 4:
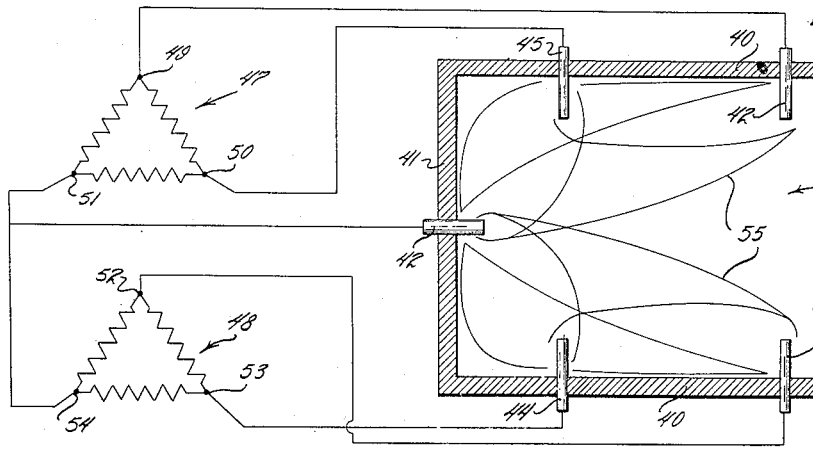
Figure 4 is a cross-sectional view of another embodiment of the invention.

In Figure 4 there is shown a second embodiment of the invention wherein a tank 39 having side walls 40 and an end wall 41 is provided with five electrodes 42, 43, 44, 45 and 46. These electrodes are fed with power from a suitable current supply shown as a pair of three phase transformers 47 and 48 having terminals 49, 50, 51, 52, 53 and 54. The transformer 47 has its terminals 49, 50 and 51 connected to electrodes 42, 45 and 46 respectively. The transformer 48 has its terminals 52, 53 and 54 connected to electrodes 43, 44 and 46 respectively. The transformers are so phased that terminals 49, 50 and 51 are at equal potentials with terminals 52, 53 and 54 respectively. The resulting current distribution is thus substantially U-shaped as indicated by the current envelopes 55 with most current flowing longitudinally of the tank except at the charging end wall.

Figure 5:
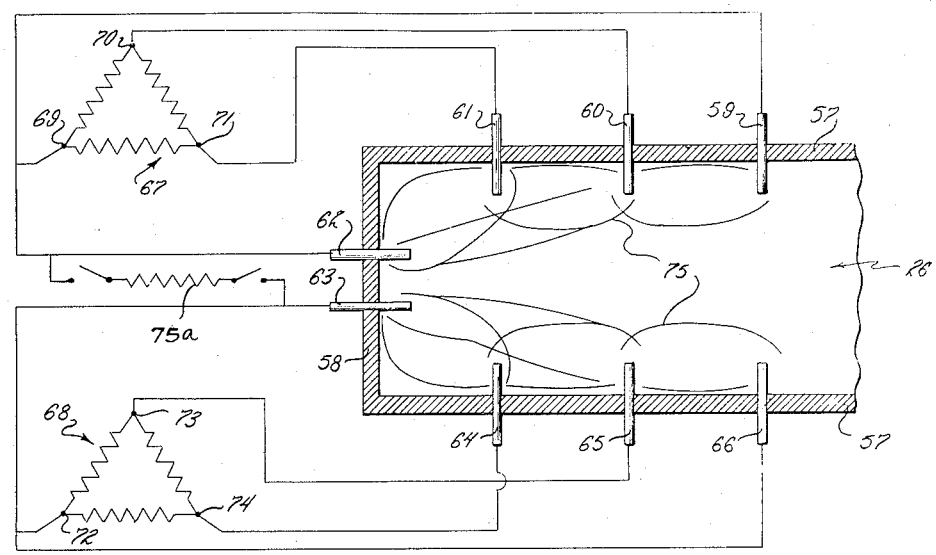
Figure 5 is a cross-sectional view of still another embodiment of the invention.

Figure 5 illustrates still a third embodiment of the invention wherein an elongated tank 56 having side walls 57 and an end wall 58 is provided with eight electrodes 59, 60, 61, 62, 63, 64, 65 and 66. These electrodes are supplied with power by any suitable current supply shown for convenience as a pair of three phase transformers 67 and 68 having terminals 69, 70 and 71, and 72, 73 and 74 respectively. The terminals 69, 70 and 71 of transformer 67 are connected respectively to the electrodes 59, 60, 61 and 62, while the terminals 72, 73 and 74 of transformer 68 are respectively connected to the electrodes 66, 65, 64 and 63.

In this embodiment of the invention, which is primarily useful in large elongated tanks, the current is completely confined to a U-shaped sector bordering the tank walls as is shown by the current envelopes 75. In installations where the end wall electrodes 62 and 63 would be so far apart as to leave an unheated area therebetween, a single phase transformer 75a may be utilized in addition to the three phase transformers in order to supply current between electrodes 62 and 63 to thereby heat the transversely extending glass between these electrodes.

Figure 6:
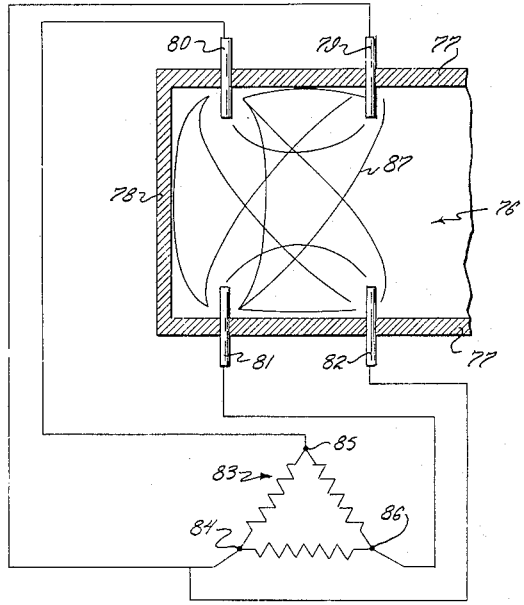
Figure 6 is a cross-sectional view of a still further embodiment of the invention.

Figure 6 illustrates an additional variation of the invention which is closely related to that disclosed in Figure 4, wherein all of the electrodes are placed in the side walls of the tank. Thus a tank 76 having side walls 77 and an end wall 78 is provided with four electrodes 79, 80, 81 and 82. The electrodes are fed from a suitable current supply such as a three phase transformer 83 having terminals 84, 85 and 86, these terminals being connected respectively to electrodes 79, 80 and 81. The electrode 82 is connected to terminal 84 and to electrode 79. The current distribution is indicated by the envelopes 87 and is substantially similar to that obtained in the embodiment of Figure 3.

Figure 7:
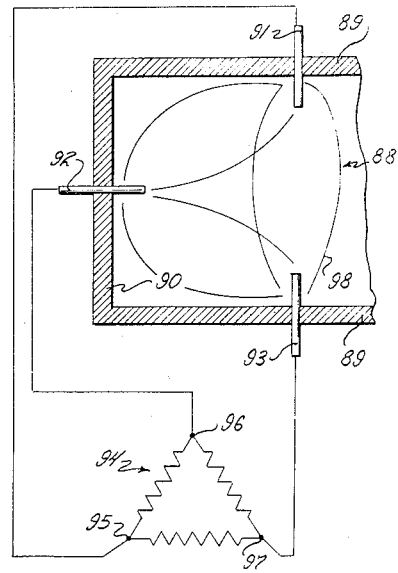
Figure 7 is a cross-sectional view of still another embodiment of the invention.

In Figure 7 there is shown a still further embodiment of the invention wherein a tank 88 having side walls 89 and an end wall 90 is provided with a set of electrodes 91, 92 and 93. These electrodes are fed with power from a suitable current supply such as a three phase transformer 94 having terminals 95, 96 and 97 which are connected respectively to the electrodes 91, 92 and 93. The current distribution is shown by the envelopes 98 and forms a V having its apex at the back wall of the tank. With this type arrangement it is found that current repulsion causes the currents to spread to the corners of the tank so that in general a current zone is created which approaches a U-shape.

Figure 10:
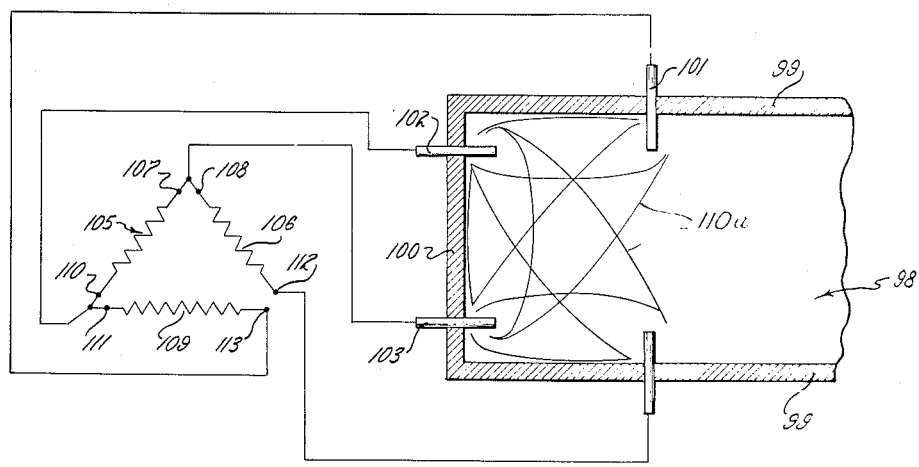
Figure 10 is a cross-sectional view of still another embodiment of the invention.

In Figure 10 there is shown an additional embodiment of the invention wherein a tank 98 having side walls 99 and an end wall 100 is provided with four electrodes 101, 102, 103 and 104. Electrodes 101 and 104 are mounted in opposite positions in side walls 99 while electrodes 102 and 103 are mounted in spaced positions in end wall 100. The current supply in this embodiment consists of an open Δ connected transformer arrangement. Thus transformer windings 105 and 106 have their terminals 107 and 108 connected together and transformers 105 and 109 have their terminals 110 and 111 connected together. Terminals 112 and 113 of transformers 106 and 109 are not connected together. Electrodes 101, 102, 103 and 104 are connected to terminals 113, 110 and 111, 107 and 108, and 112 respectively. Because of the open Δ nature of the transformer arrangement it is possible to develop different voltages across the various windings without causing a circulating Δ current as ordinarily would be the case were the Δ arrangement closed. This makes it possible to vary the transformer voltages to take care of particular current distribution problems developing in the glass mass. Thus an extra heavy current may be positioned near and along the back wall by providing a voltage in transformer 105 which is higher than the voltages developed in transformers 106 and 109. In a similar manner other unsymmetrical current distributions may be created, the current envelopes in a particular instance being shown at 110a.

Figure 9:
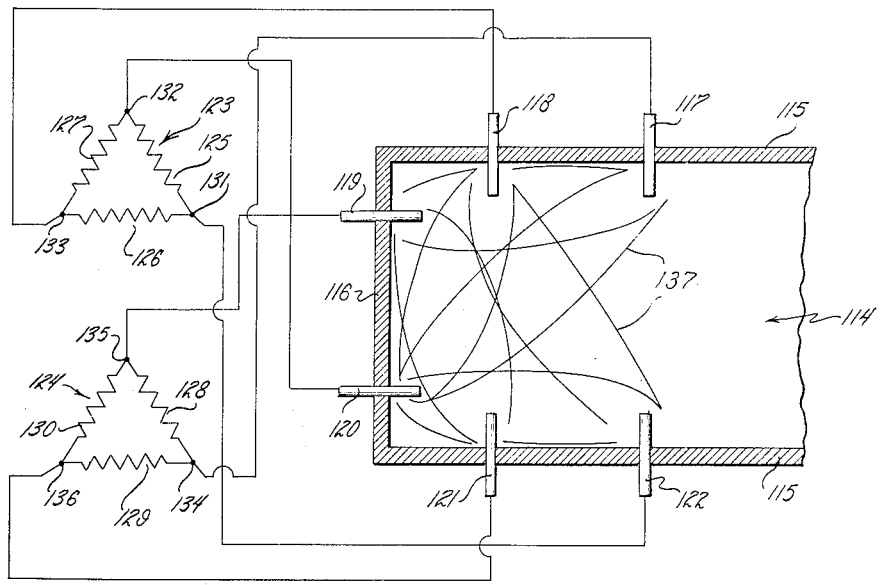
Figure 9 is a cross-sectional view of another embodiment of the invention.

Figure 9 shows a further embodiment of the invention wherein a tank 114 having side walls 115 and an end wall 116 is provided with electrodes 117, 118, 119, 120, 121 and 122. Electrodes 117, 118 and 121, 122 are located in opposite apertures in the side walls 115 while electrodes 119 and 120 enter spaced apertures in the end wall 116. A suitable current supply may be provided such as the two transformers or sets of transformers 123 and 124 having windings 125, 126 and 127, and 128, 129 and 130 respectively. The windings may be connected in any suitable manner and in Figure 9 are shown as being Δ connected to form three phase terminals 131, 132 and 133, and 134, 135 and 136 respectively. Electrodes 117, 118, 119, 120, 121 and 122 are connected to terminals 134, 133, 135, 132, 136 and 131 respectively. The current distribution produced is illustrated by the current envelopes 137 and conforms to the desired U-shape configuration.

The circuit diagrams and electrode arrangements illustrated are shown as representative examples of connections in accordance with this invention. The diagrams are not intended to be exclusive and other connections are feasible. The primary objective is to obtain a liberation of electrically produced heat in a generally U or V-shaped band adjacent the end and side walls of the tank under the batch blanket. While it is possible to employ circuits which will cause a portion of the current to travel across the tank farther from the back wall than is described herein, the heat thus liberated should not predominate over the heat liberated in the V and U-shaped current paths. For best results more than half of the heat liberated due to electricity by the Joule effect should be in a zone adjacent the side walls and back wall of the furnace under the area generally covered with the floating batch blanket. This zone should ordinarily be no wider than approximately one-fourth the tank width and should be confined to the area beneath the batch blanket.

The drawings and description are intened to be illustrative in nature and should not be deemed limiting in any manner, the invention being limited solely by the terms and spirit of the appended claims.

I claim:

1. A method of manufacturing glass in a furnace which comprises heating the glass bath by heat from combustion and simultaneously heating the glass bath by Joule effect electric currents passing through said glass bath between electrodes within said furnace and near the walls thereof in such a manner as to liberate over one half of said Joule effect heat in a zone near the side and back walls of said furnace.

2. A method of manufacturing glass in a furnace which comprises heating the glass bath by heat from combustion and simultaneously heating the glass bath by Joule effect electric current passing through said glass bath between electrodes within said furnace and near the walls thereof in such a manner as to liberate over one half of said Joule effect heat in said furnace in a generally U-shaped zone near the side and back walls thereof.

3. A method of manufacturing glass in a furnace which comprises heating the glass bath by heat from combustion and simultaneously heating the glass bath by Joule effect electric currents passing through said glass bath between electrodes entering the side and back walls of said furnace in such a manner as to liberate over one-half of said Joule effect heat in a generally U-shaped zone within said furnace near the side and back walls thereof.

4. A method of manufacturing glass in a furnace having a melting zone and a fining zone which comprises heating the glass bath by heat from combustion and simultaneously heating the glass bath in said melting zone by Joule effect electric currents passing through said glass bath in said melting zone between electrodes near the back and side walls of said furnace in such a manner as to liberate over one half of said Joule effect heat in said melting zone in a U-shaped zone adjacent the side and back walls of said furnace.

5. A method of manufacturing glass in a furnace which comprises heating the glass bath by heat from combustion and simultaneously heating the glass bath by Joule effect electric currents passing through said glass bath between electrodes near the walls of the furnace in such a maner as to liberate over one-half of said Joule effect heat in a generally U-shaped zone which parallels the side walls and back wall of said furnace under the area covered with floating batch materials, the width of said zone being less than approximately one fourth the distance between the side walls of said furnace.

6. A method of manufacturing glass in a furnace which comprises heating the glass bath by heat from combustion and simultaneously heating the glass bath by Joule effect electric currents passing through said glass bath between electrodes near the walls of the furnace in such a manner that over one-half of said current flows longitudinally along the side walls of said furnace within a zone along each side wall which is no wider than one-fourth the distance from side wall to side wall and transversely along the back wall of said furnace in a zone of similar width.

7. A glass furnace having side and end walls, a plurality of electrodes entering said furnace to permit current to flow through a glass mass in said furnace, and current supply means for supplying power to said electrodes, said current supply means being so connected to said electrodes and said electrodes being so positioned to restrict at least half of the current flowing in the glass mass to a zone contiguous one end wall and the side walls of said furnace.

8. In a glass furnace having side and end walls enclosing a melting zone and a fining zone; a plurality of electrodes entering said furnace in the melting zone thereof to permit the establishment of current flow in a glass mass in said melting zone, and current supply means for supplying power to said electrodes, said eelctrodes being so positioned in said melting zone and said current supply means being so connected to said electrodes to cause at least half of the current flowing in said glass mass to be confined in a generally U-shaped zone running along the side walls of said furnace and along the end wall in the melting zone.

9. In a glass furnace having side and end walls enclosing a melting zone and a fining zone; a plurality of electrodes entering the melting zone of said furnace through said walls to permit the establishment of current flow in a glass mass in said melting zone, and current supply means for supplying power to said electrodes, said electrodes being so positioned in said melting zone and said current supply means being so connected to said electrodes to cause at least half of the current established in said glass mass to be confined to a generally U-shaped zone running along the end wall in the melting zone and along the adjoining side walls.

10. In a glass furnace having side and end walls enclosing a melting zone and a fining zone; a plurality of electrodes entering the melting zone of said furnace through said walls to permit the establishment of current flow in a glass mass in said melting zone, at least four of said electrodes entering opposite positions in respective side walls to form a pair of electrodes in each side wall, and current supply means for supplying power to said electrodes, the electrodes in each pair being connected to different terminals of said current supply means so as to cause current flow between the two electrodes in each pair, said plurality of electrodes being so positioned in said melting zone and said current supply means being so connected to said electrodes to cause at least half of the current established in said glass mass to be confined to a generally U-shaped zone running along the end wall in the melting zone and along the adjoining side walls.

11. A glass furnace as set out in claim 10 wherein said electrodes enter said walls through apertures in the lowermost fourth thereof.

12. A glass furnace as set out in claim 10 wherein said electrodes enter said walls through apertures in the lowermost fourth thereof and are upwardly inclined from the horizontal.

13. A glass furnace as set out in claim 10 wherein said electrodes enter said furnace at the juncture of the bottom thereof and one of said walls.

14. In a glass furnace having side and end walls enclosing a melting zone and a fining zone; a plurality of electrodes entering the melting zone of said furnace through said walls to permit the establishment of current flow in a glass mass in said melting zone, at least one of said electrodes entering the end wall in said melting zone, at least two of said electrodes entering opposite positions in respective side walls, and current supply means for supplying power to said electrodes, said electrodes being so positioned in said melting zone and said current supply means being so connected to said electrodes to cause at least half of the current established in said glass mass to be confined to a generally U-shaped zone running along the end wall in the melting zone and along the adjoining side walls.

15. In a glass furnace having side and end walls enclosing a melting zone and a fining zone; a plurality of electrodes entering the melting zone of said furnace through said walls to permit the establishment of current flow in a glass mass in said melting zone, at least two of said electrodes entering the end wall in said melting zone, at least two of said electrodes entering opposite positions in respective side walls, and current supply means for supplying power to said electrodes, said electrodes being so positioned in said melting zone and said curent supply means being so connected to said electrodes to cause at least half of the current established in said glass mass to be confined to a generally U-shaped zone running along the end wall in the melting zone and along the adjoining side walls.

16. A glass furnace as set out in claim 15 wherein said electrodes enter said walls through apertures in the lowermost fourth thereof.

17. A glass furnace as set out in claim 16 wherein said electrodes are upwardly inclined from the horizontal.

18. A glass furnace as set out in claim 17 wherein said electrodes enter said furnace at the juncture of the bottom thereof and the end wall.

19. In a glass furnace having side and end walls enclosing a melting zone and a fining zone; a plurality of electrodes entering the melting zone of said furnace through said walls to permit the establishment of current flow in a glass mass in said melting zone, at least two of said electrodes entering the end wall in said melting zone, at least four of said electrodes entering opposite positions in respective side walls to form a pair of electrodes in each side wall, and current supply means for supplying power to said electrodes, said electrodes being so positioned in said melting zone and said current supply means being so connected to said electrodes to cause at least half of the current established in said glass mass to be confined to a generally U-shaped zone running along the end wall in the melting zone and along the adjoining side walls.

20. In a glass furnace having side and end walls defining a melting zone and a fining zone adapted to contain a mass of glass; a first pair of electrodes entering the melting zone of said furnace through opposite apertures in said side walls, a second pair of electrodes entering said melting zone through spaced apertures in said end wall, and a three phase current supply for supplying power to said electrodes, said first pair of electrodes being connected to one terminal of said current supply, the electrodes of said second pair of electrodes being respectively connected to the remaining terminals of said current supply, said electrodes being so positioned as to cause at least half of the electric currents in the glass mass to be confined in a generally U-shaped zone running along the side walls and electrode containing end wall.

21. A glass furnace as set out in claim 15 wherein said three phase current supply comprises three transformer windings connected to form an open delta, and wherein said first pair of electrodes are connected to the open terminals of said delta connected transformer windings.

22. In a glass furnace having side and end walls defining a melting zone and a fining zone adapted to contain a glass mass; a first pair of electrodes entering the melting zone of said furnace through opposite apertures in said side walls, a second pair of electrodes entering said melting zone through opposite apertures in said side walls, said second pair of electrodes being located between said first pair of electrodes and the end wall defining said melting zone, and a three phase current supply for supplying power to said electrodes, said first pair of electrodes being connected to one terminal of said current supply, the electrodes of said second pair of electrodes being respectively connected to the remaining terminals of said current supply, said electrodes being so positioned as to cause at least half of the electric currents in the glass mass to be confined in a generally U-shaped zone running along the side walls and end wall in said melting zone.

23. In a glass furnace having side and end end walls defining a melting zone and a fining zone adapted to contain a glass mass; a first pair of electrodes entering the melting zone of said furnace through opposite apertures in said side walls, a second pair of electrodes entering said melting zone through opposite apertures in said side walls, a third pair of electrodes entering said melting zone through opposite apertures in said side walls, said third pair of electrodes being located between said first and second pairs of electrodes and the end wall defining said melting zone, a fourth pair of electrodes entering said melting zone through spaced apertures in said end wall, and a pair of three phase current supplies for supplying power to said electrodes, said first pair of electrodes being connected to first corresponding phases of said current supplies, said second pair of electrodes being connected to second corresponding phases of said transformers, said third pair of electrodes being connected to third corresponding phases of said current supplies, said fourth pair of electrodes being connected to said first corresponding phases, said electrodes being so positioned as to cause at least half of the electric currents in the glass mass to be confined in a generally U-shaped zone running along the side walls and electrode containing end wall.

24. In a glass furnace having side and end walls defining a melting zone and a fining zone adapted to contain a glass mass; a pair of electrodes entering the melting zone of said furnace through opposite apertures in said side walls, at least one electrode entering said melting zone through an aperture in the end wall defining said melting zone, a three phase current supply for supplying power to said electrodes, each of said electrodes being connected to a different terminal of said current supply, said electrodes being so positioned as to cause at least half of the electric currents in the glass mass to be confined in a generally U-shaped zone running along the side walls and electrode containing end wall.

25. A glass furnace as set out in claim 24 wherein said electrodes enter said walls through apertures in the lowermost fourth thereof.

26. A glass furnace as set out in claim 25 wherein said electrodes are upwardly inclined from the horizontal.

27. A glass furnace as set out in claim 26 wherein said electrode enters said furnace at the juncture of the bottom thereof and one of said walls.

References Cited in the file of this patent

UNITED STATES PATENTS

| | | |
|---|---|---|
| 1,062,362 | Sauvageon | May 20, 1913 |
| 1,610,377 | Hitner | Dec. 14, 1926 |
| 1,880,540 | Wadman | Oct. 4, 1932 |
| 1,880,541 | Wadman | Oct. 4, 1932 |
| 2,033,029 | Greene | Mar. 3, 1936 |
| 2,089,690 | Cornelius | Aug. 10, 1937 |
| 2,225,616 | Borel | Dec. 24, 1940 |
| 2,267,537 | Romazzotti | Dec. 23, 1941 |
| 2,274,986 | Kilian et al. | Mar. 3, 1942 |
| 2,277,678 | Borel | Mar. 31, 1942 |
| 2,283,188 | Cornelius | May 19, 1942 |
| 2,350,734 | Dumarest | June 6, 1944 |
| 2,397,852 | Gentil | Apr. 2, 1946 |
| 2,417,913 | Cornelius | Mar. 25, 1947 |
| 2,523,030 | Labino | Sept. 19, 1950 |
| 2,545,619 | Lambert | Mar. 20, 1951 |
| 2,552,395 | Borel et al. | May 8, 1951 |
| 2,636,913 | Lambert | Apr. 28, 1953 |
| 2,658,095 | Arbeit et al. | Nov. 3, 1953 |
| 2,659,764 | Konig | Nov. 17, 1953 |
| 2,693,498 | Penberthy | Nov. 2, 1954 |

FOREIGN PATENTS

| | | |
|---|---|---|
| 597,678 | Great Britain | Jan. 30, 1948 |